United States Patent
Ha et al.

(10) Patent No.: US 9,446,370 B2
(45) Date of Patent: Sep. 20, 2016

(54) REACTOR SYSTEM FOR PRODUCING HYDROCARBONS FROM SYNTHETIC GAS

(75) Inventors: Kyoung Su Ha, Daejeon (KR); Geun Jae Kwak, Daejeon (KR); Jae-Hoon Jung, Daejeon (KR); Joo Young Cheon, Daejeon (KR); Ki Won Jun, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 38 days.

(21) Appl. No.: 14/111,384

(22) PCT Filed: Apr. 18, 2012

(86) PCT No.: PCT/KR2012/002949
§ 371 (c)(1),
(2), (4) Date: Oct. 11, 2013

(87) PCT Pub. No.: WO2012/144796
PCT Pub. Date: Oct. 26, 2012

(65) Prior Publication Data
US 2014/0044614 A1    Feb. 13, 2014

(30) Foreign Application Priority Data

Apr. 19, 2011 (KR) .................. 10-2011-0036171

(51) Int. Cl.
*B01J 8/00* (2006.01)
*C07C 1/04* (2006.01)
(Continued)

(52) U.S. Cl.
CPC ............. *B01J 16/005* (2013.01); *B01J 12/007* (2013.01); *B01J 19/0093* (2013.01);
(Continued)

(58) Field of Classification Search
CPC .............. B01J 8/00; C07C 1/04; C10G 2/00; F28D 7/02
USPC ........................ 422/198, 633; 165/165, 906
See application file for complete search history.

(56) References Cited

U.S. PATENT DOCUMENTS 2,310,962 A * 2/1943 Lassiat ...................... 422/181
2,314,966 A * 3/1943 Astle ...................... F28F 3/083
   159/28.6

(Continued)

FOREIGN PATENT DOCUMENTS

FR    2934174 A1    1/2010
JP    10-281015 A    10/1998
(Continued)

OTHER PUBLICATIONS

Report mailed Oct. 29, 2012; PCT/KR2012/002949.

*Primary Examiner* — Huy-Tram Nguyen
(74) *Attorney, Agent, or Firm* — Ladas & Parry LLP

(57) ABSTRACT

The invention relates to a reactor system, comprising a heat-exchange unit and a reaction unit that are assembled together into a structure. The heat-exchange unit has a plurality of plate or corrugated-plate heat exchangers, and is formed so as to attachable/detachable to/from the reaction unit and insertable into the latter. Accordingly, a catalyst may be attached to a heat-transfer surface of a heat exchanger by a washcoat method or the like, thus maximizing heat-transfer efficiency and enabling the easy removal or reattachment of the catalyst when the enabling the easy removal or reattachment of the catalyst at the end of the lifespan of the catalyst.

8 Claims, 3 Drawing Sheets

(51) Int. Cl.

| | | |
|---|---|---|
| *B01J 16/00* | (2006.01) | |
| *B01J 12/00* | (2006.01) | |
| *B01J 19/24* | (2006.01) | |
| *C10G 2/00* | (2006.01) | |
| *F28F 9/02* | (2006.01) | |
| *F28D 9/00* | (2006.01) | |
| *B01J 19/00* | (2006.01) | |

(52) U.S. Cl.
CPC ............ *B01J 19/249* (2013.01); *C10G 2/341* (2013.01); *F28D 9/0006* (2013.01); *F28F 9/026* (2013.01); *B01J 2219/00085* (2013.01); *B01J 2219/0086* (2013.01); *B01J 2219/00783* (2013.01); *B01J 2219/00786* (2013.01); *B01J 2219/00806* (2013.01); *B01J 2219/00822* (2013.01); *B01J 2219/00824* (2013.01); *B01J 2219/00835* (2013.01); *B01J 2219/00873* (2013.01); *B01J 2219/247* (2013.01); *B01J 2219/2434* (2013.01); *B01J 2219/2438* (2013.01); *B01J 2219/2453* (2013.01); *B01J 2219/2458* (2013.01); *B01J 2219/2459* (2013.01); *B01J 2219/2462* (2013.01); *B01J 2219/2479* (2013.01); *B01J 2219/2493* (2013.01); *B01J 2219/2495* (2013.01); *B01J 2219/2496* (2013.01); *B01J 2219/2497* (2013.01); *B01J 2219/2498* (2013.01); *F28F 2280/02* (2013.01)

(56) References Cited

U.S. PATENT DOCUMENTS

| | | | |
|---|---|---|---|
| 3,661,203 A * | 5/1972 | Mesher ................. | F28F 3/046 165/167 |
| 3,955,620 A | 5/1976 | Artemov et al. | |
| 4,434,845 A * | 3/1984 | Steeb ........................ | 165/153 |
| 5,997,831 A * | 12/1999 | Dettling et al. ............. | 423/219 |
| 6,616,909 B1 | 9/2003 | Tonkovich et al. | |
| 2002/0192133 A1 | 12/2002 | Eaton et al. | |
| 2003/0068261 A1 | 4/2003 | Taheri et al. | |
| 2003/0111216 A1* | 6/2003 | Hirao et al. ................. | 165/166 |
| 2004/0168791 A1* | 9/2004 | Batt ........................... | 165/165 |
| 2006/0048926 A1* | 3/2006 | Richter ....................... | 165/165 |
| 2006/0276334 A1 | 12/2006 | Balduf et al. | |
| 2007/0053808 A1 | 3/2007 | Markowz et al. | |
| 2007/0163749 A1* | 7/2007 | Miyahara ................... | 165/80.3 |
| 2008/0031788 A1 | 2/2008 | Brophy et al. | |
| 2008/0087409 A1* | 4/2008 | Nakamura ................. | 165/165 |
| 2010/0133474 A1 | 6/2010 | Leveson | |

FOREIGN PATENT DOCUMENTS

| | | |
|---|---|---|
| JP | 2006-071224 A | 3/2006 |
| KR | 1020090007973 A | 1/2009 |
| WO | 2005/011858 A1 | 2/2005 |
| WO | 2006/075193 A1 | 7/2006 |
| WO | 2009/081175 A1 | 7/2009 |

* cited by examiner

REACTOR SYSTEM FOR PRODUCING HYDROCARBONS FROM SYNTHETIC GAS

TECHNICAL FIELD

The present invention relates to a reactor system for producing hydrocarbons from synthesis gas, and more particularly, to a reactor system for producing hydrocarbons and oxygenate with Fischer-Tropsch catalyst by supplying synthesis gas as feed while facilitating an easy replacement of the catalyst.

BACKGROUND ART

As is well known according to the F-T synthesis method developed by Fischer and Tropsch, who were chemists in Germany in 1923, it is now possible to produce liquid hydrocarbons from synthesis gas derived from coal, natural gas, biomass and the like. The process to produce the liquid hydrocarbons from coal is called a CTL (Coal-to-liquids, referred also to as a coal liquefaction technology) process; the process to produce the liquid hydrocarbons from the natural gas is called a GTL (Gas-to-liquids, referred also to as a natural gas liquefaction technology) process; and the process to produce the liquid hydrocarbons from biomass is called a BTL (Biomass-to-liquid, referred also to as a biomass liquefaction technology) process. In recent years, all similar processes are commonly called XTL technology.

These processes first convert raw materials (e.g., coal, natural gas and biomass) into synthesis gas using a method of gasification, reforming, or the like. The composition of the synthesis gas suitable for the XTL process to produce a liquid fuel preferably uses the ratio of hydrogen to carbon monoxide which becomes about 2 as expressed by the following equation.

$$CO+2H_2+-[CH_2]_{-n} \rightarrow -[CH_2]_{-n+1}+H_2O$$

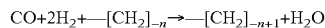

where $CO$, $H_2$, $-[CH_2]_{-n}$, and $H_2O$ are carbon monoxide, hydrocarbons, hydrocarbon with a chain length n (the number of carbons, n), and water, respectively. However, as the proportion of hydrogen increases, the selectivity of methane becomes higher and the selectivity of $C_{5+}$ (hydrocarbons with n≥5) is relatively reduced, so this method is not suitable. Further, a by-product is also produced, such as olefin and oxygenate (molecule containing oxygen atoms such as alcohol, aldehyde, ketone, etc.), as well as the hydrocarbons in the form of paraffin having a linear chain as described above.

Since one of the main goals of the XTL process is to obtain the liquid fuel, a recent trend aims to optimize a cobalt-base catalyst, ratio of hydrogen to carbon monoxide, temperature, and pressure of the synthesis gas, and others to yield linear hydrocarbons, in particular, linear hydrocarbons of $C_{5+}$ with high selectivity.

Except for the cobalt-based catalyst, an iron-based catalyst is also widely used as a catalyst. The iron-based catalyst, which has been mainly used at an early stage, is less expensive than the cobalt-based catalyst and has low methane selectivity at high temperature and higher olefin selectivity among hydrocarbons. Further, the iron-based catalyst is used to produce olefin-based products, in addition to the liquid fuel.

In contrast, the cobalt-based catalyst is mainly used to produce the liquid fuel while producing less carbon dioxide and has a relatively long lifespan. However, the cobalt-based catalyst is extremely expensive in comparison to the iron-based catalyst, and its methane selectivity increases at high temperature, which requires a reaction at a relatively low temperature. Further, since the cobalt-based catalyst is expensive, it is necessary to distribute it well and use a small amount on the surface of a support. A compound such as alumina, silica, titania, etc. may be used as the support, and a noble metal such as Ru, Pt, Re, and the like may be used as a promoter to improve the performance of the cobalt-based catalyst.

Several types of reactors have been studied to date such as a tubular fixed bed reactor, a fluidized bed reactor, a slurry phase reactor, a micro-channel reactor or multi-channel reactor with a heat exchanger, and the like. A representative fluidized bed reactor may include a circulating fluidized bed reactor and a fixed fluidized bed reactor. Since reaction characteristics and distribution of products vary depending on the shape of the reactor and the reaction condition, it is necessary to select a catalyst appropriately depending on the final product of interest.

In the existing commercialization process more than 10,000 BPD, the fluidized-bed reactor (available from SASOL Limited) and a tubular fixed bed reactor (available from Royal Dutch Shell plc.) have been mainly used.

However, these reactors are suitable for relatively large-scale gas fields. Therefore, a need exists for a more compact and highly efficient reactor suitable for gas fields that are much smaller, or the use of the wasted associated gas.

In recent years, as considerable attention has been paid to a FPSO (Floating Production, Storage and Offloading) process which is designed to produce while searching for resources and loading and unloading at a place where there is a demand, a study on the process having a small scale but high efficiency has been promoted globally. GTL (Gas-To-Liquids) FPSO is a GTL plant on ships having a limited space, and thus it is beneficial that volume of the reactor relative to production is as small as possible. Therefore, it is believed that the multi-channel reactor or the micro-channel reactor among the reactors as described above is the most promising type of reactor.

The micro-channel reactor is fabricated in a structure in which a catalytic reaction unit and a heat exchange unit are alternately stacked, wherein any one of them is composed of micro-channels. When the heat exchange unit is configured with the micro-channel, the catalytic reaction unit may be configured with a fixed layer of a slab type or the catalytic reaction unit may also be configured with the micro-channels. In the catalytic reaction unit composed of the micro-channels, the micro-channels may be filled with the catalyst by inserting it therein or the catalyst may be attached to the inner wall of the reactor using a coating method.

Such FT reactors are particularly suitable for producing diesel, lube base oil and waxes and are operated mainly in a low temperature F-T process.

During a low temperature F-T process, a hydrocarbon with a high boiling point more than diesel is produced over 60%. Therefore, the diesel is additionally manufactured through subsequent steps such as a hydrocracking process and the like, and wax ingredient is converted into high quality lube base oil through a dewaxing process.

The tubular fixed bed reactor and the slurry phase reactor that are representative of the low-temperature F-T reaction have several advantages, but also have a great disadvantage in size compared to the micro-channel reactor or the multi-channel reactor.

The tubular fixed bed reactor has advantages, such as a burden for scaling-up is relatively low, and a mechanical loss of the catalyst is small. Despite the merits, this type of reactor requires an enormous volume relative to production capacity, and the cost for installation and construction is known to be expensive. In addition, since it has a relatively low heat and mass transfer efficiency inside the catalyst layer, it is hard to control the highly exothermic or highly endothermic reaction.

The slurry phase reactor is less expensive in terms of construction costs and equipment costs, and it also has a relatively high heat and mass transfer efficiency. However, in order to scale-up this type of reactor, the complex hydrodynamic behavior inside the reactor should be rigorously analyzed, which makes the design very difficult. In addition, this type of reactor usually suffers from a mechanical loss of catalyst particles due to the collision and friction.

The multi-channel reactor (hereinafter, referred to inclusive of the micro-channel reactor) is a reactor having maximized heat transfer efficiency so that the reaction can occur at high space velocity. The multi-channel reactor occupies less volume relative to the production capacity (about ⅕ to ½ the level relative to a conventional reactor), and its construction and equipment cost is relatively low. Further, it could be scaled-up by numbering-up. Due to the absence of collision and friction of catalyst particles in the bed, the mechanical loss of catalyst particles could be significantly reduced. In addition, even in the case of movement of the reactor, the change of reactor outcome could be minimized and the mechanical loss of catalyst is expected to be negligible.

However, in the case where the catalyst is wash-coated on the wall of the reactor such as a wall reactor, it is extremely hard or nearly impossible to replace the catalyst when the catalyst's life has ended. In a type of fixed-bed, the replacement of the catalyst is relatively easy, but the heat transfer efficiency decreases compared to the type of a wall-coated reactor that is wash-coated on the wall thereof.

DISCLOSURE

Technical Problem

In view of the above, in order to solve the problem of replacement of the catalyst that is a disadvantage of a wall-coated multi-channel reactor, the present invention provides a reactor system having a structure in which a heat exchange unit and a reaction unit are prefabricated separately.

Effect of the Invention

In accordance with an aspect of the present invention, there is provided a reactor system for producing hydrocarbons from synthesis gas, which includes: a heat exchange unit configured to inject a heat transfer medium therein and discharge the heat transfer medium that has been heat exchanged while passing through a plurality of heat exchange plates; a dispersion unit configured to distribute the injected heat transfer medium to the respective heat exchange plates; a shell configured to have an inner reaction space into which the heat exchange plates of the heat exchange unit are inserted through an opened one side, wherein the inner reaction space is partitioned by the heat exchange plates to define reaction channels, a reaction mixture is injected into the reaction channels and a product mixture is then discharged from the shell; a fixing groove arranged at the side facing the reaction space into which the heat exchange plates are inserted and configured to fix the inserted heat exchange plates therein; and flanges configured to fasten the heat exchange unit and the shell, wherein catalyst material is attached to the heat exchange plates before the heat exchange unit and the shell are assembled together.

The heat exchange unit may be made in a flat-type having a heat transfer path formed therein with a plurality of fins arranged thereon in regular intervals or in the shape of a corrugated plate.

Each of the heat exchange plates may have a surface with oxidation treatment for easy attachment of the catalyst material thereto.

An inert material may be filled in upper and lower spaces of the reaction channels to distribute the injected reaction mixture and the product mixture or a dispersion plate may be installed in upper and lower portions of the reaction channels to distribute the injected reaction mixture and the product mixture. Alternatively, the inert material may be filled in upper and lower spaces of the reaction channels and the dispersion plate may be installed in upper and lower portions of the reaction channels.

The catalyst material may be attached to the surfaces, which face the heat exchange plates, of the reaction channels at both ends among the reaction channels, and the width of the reaction channels at the both ends is ½ or less than that of the other reaction channels.

A plurality of the reactor systems may be coupled in serial and/or parallel and organized in a module.

Effect of the Invention

In accordance with the present invention, there is provided a reactor system in which a heat exchange unit, which includes a plurality of heat exchange plates in a flat-type or in the shape of a corrugated plate, is made to be removable so that it can be inserted into a reaction space and in which the catalyst is attached to the heat transfer surfaces of the heat exchange plates of the heat exchange unit by a wash coat method or the like, thereby maximizing heat transfer efficiency and facilitating easy removal of the catalyst or reattachment of the catalyst at the end of the catalyst's life.

BEST MODE FOR THE INVENTION

Hereinafter, the embodiments of the present invention will be described in detail with reference to the accompanying drawings so that they can be readily implemented by those skilled in the art.

Figure 1:
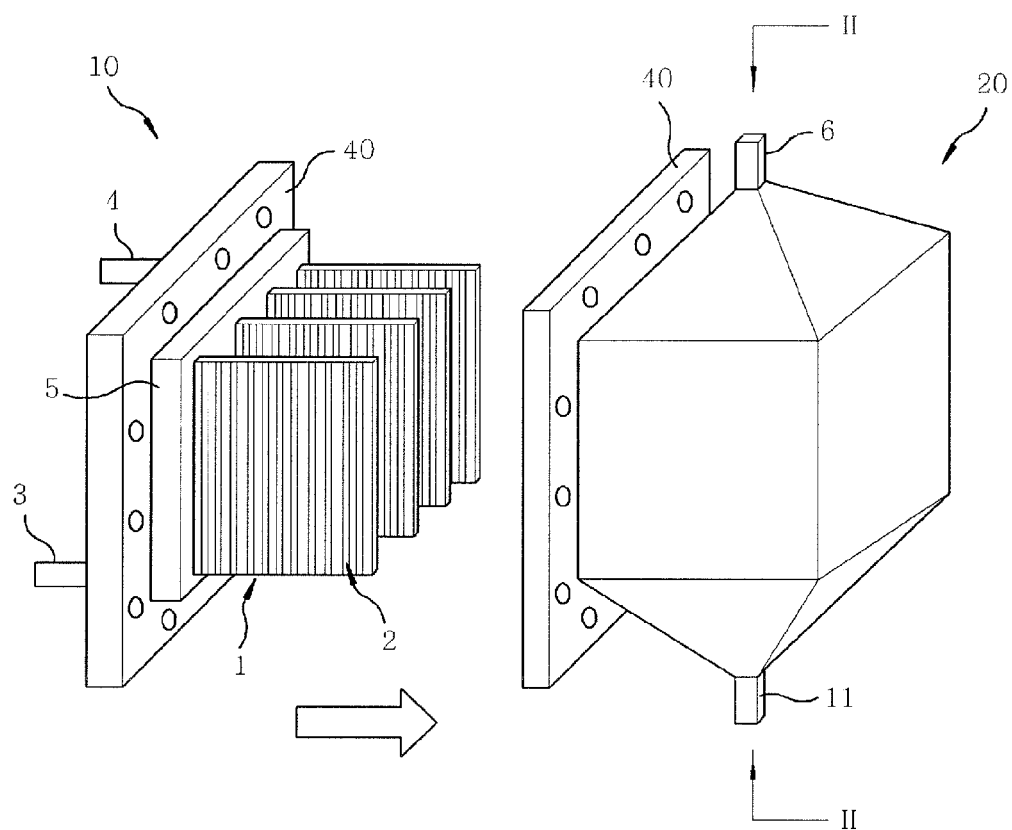
FIG. 1 is an exploded perspective view of a prefabricated multi-channel reactor system in accordance with an embodiment of the present invention.

FIG. 1 illustrates an exploded perspective view of a prefabricated multi-channel reactor system in accordance with an embodiment of the present invention. As illustrated in FIG. 1, a reactor system of the embodiment is used to produce hydrocarbons from synthetic gas and includes a heat exchange unit 10 through which a heat transfer medium is injected, heat-exchanged through a plurality of heat exchange plates and then flowed out; a dispersion unit 5 to distribute the injected heat transfer medium to the respective heat exchange plates 1; a shell having an opened one side through which the heat exchange plates 1 of the heat exchange unit 10 are inserted within an inner reaction space, wherein the inner reaction space is partitioned by the heat exchange plates 1 to define plural reaction channels 8 (see, FIG. 2), a reaction mixture is injected into the reaction channels 8, and a product mixture is discharged; fixing grooves 21 (see, FIG. 3) facing the reaction space, in which the inserted heat exchange plates 1 are tied up; and flanges 40 to fasten the heat exchange unit 10 and the shell 20. Before assembling the heat exchange unit 10 and the shell 20, a catalyst material is attached to the heat exchange plates 1 of the heat exchange unit 10.

As such, the heat exchange plates 1 of the heat exchange unit 10 on which the catalyst is expected to attach is inserted into the reaction space of the shell 20 in a direction of an arrow, and the flange 40 of the heat exchange unit 10 is then fastened with the flange 40 of the shell 20, thereby forming the reactor system.

The heat exchange plates 1 of the heat exchange unit 10 act as a heat exchange surface on which a heat exchange substantially takes place and has a plurality of fins 2 that are arranged at equal intervals in order to increase heat transfer areas. Within each of the heat exchange plates 1, a fluid path suitable for the heat transfer is formed so that the heat transfer medium can achieve its heat transfer function while allowing the heat transfer medium flow evenly. The heat transfer medium includes, for example, a cooling water, steam, solid molten salt, oil containing silicon or fluorine, biphenyl and a mixture of biphenyl ether. Although a representative material as an example of the solid molten salt is natrium nitrate and a mixture in which the natrium nitrate is mixed in an appropriate ratio, it is also possible to select and use any of various solid molten salts satisfying a range of a desired temperature. The above examples are merely some of the representative heat transfer media, and it is understood that the embodiment is not limited thereto.

In the heat exchange unit 10, the flange 40 has an inlet 3 and an outlet 4, which are formed at its one surface, through which the heat transfer medium is injected and discharged, respectively. Mounted on the other surface of the flange 40 is the dispersion unit 5 by which the heat transfer medium injected through the inlet 3 is dispersed. A distributor may be installed, or solid particles may be filled in the inner space of the dispersion unit 5 so that the heat transfer medium can be evenly distributed to the respective heat exchange surfaces inside the heat exchange plates 1. Further, the dispersion unit 5 also serves to prevent a reaction gas from leaking, upon being fastened with the shell 20. Additionally or alternatively, a gasket may be installed around the dispersion unit 5 or before a front portion of the dispersion unit 5, if necessary.

In the heat exchange unit 10, a heat transfer fluid is filled from a foremost heat transfer plate 1, heat-exchanged at a backmost heat transfer plate 1 and then discharged through the outlet 4.

A catalyst material for the reaction is attached to the surfaces of the respective heat exchange plates 1 in a way such as a wash coat.

Meanwhile, the shell 20 is composed of a reaction channel 8 and an upper space 7 and a lower space 9, in the form of a tetrahedron cone, that are disposed in an opposite direction to each other at an upper part and a lower part of the reaction channels 8. An injection hole 6 is formed at an apex of the cone to inject the reaction mixture, and a discharge hole 11 is formed at an apex of the cone to discharge the product mixture.

Figure 2:
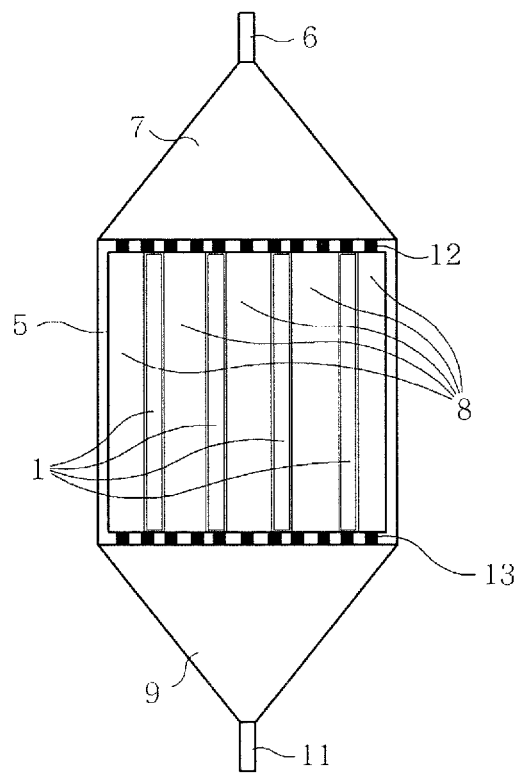
FIG. 2 is a sectional view taken along a line II-II of a multi-channel reactor system that is assembled.

FIG. 2 is a sectional view of an assembled multi-channel reactor system taken along a line II-II. As illustrated in FIG. 2, an inert material particle layer may be stuffed into the upper space 7 and the lower space 9 in order to disperse the product mixture. The inert material may include, for example, alumina, Raschig rings, glass beads or the like.

Alternatively, when it is not sufficient to achieve the dispersion effect of the inert particle layer for the purpose of dispersing a gas mixture or in the absence of the inert particle layer, then dispersion plates 12 and 13 may be additionally installed on the upper and the lower part of the reaction channels 8, respectively, in order to improve the dispersion performance of gas, and both the inert material and the dispersion plates 12 and 13 may also be employed if needed. The dispersion plates 12 and 13 may be formed by, for example, metal foam, disk-shaped filters (metal or ceramic) and the like.

Each of the reaction channels 8 is a reaction space partitioned by the heat exchange plates 1. The catalyst material is attached to all left and right surfaces but to both ends of the reaction channels 8. In the reaction channels 8 located at both ends, specifically, the surfaces facing the heat exchange plates 1 have the catalyst attached thereto.

Figure 3:
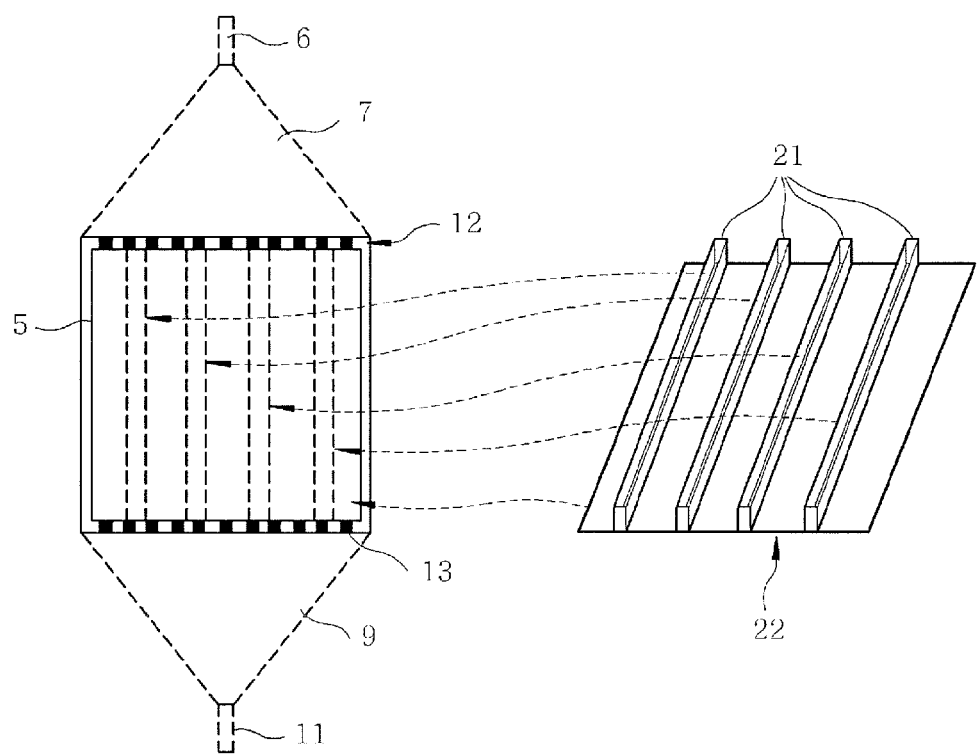
FIG. 3 is a detailed view in part showing groove portions that are fixed with the end portion of the heat exchange plate.

If necessary, in FIG. 2, it is preferable that the width of the leftmost and rightmost reaction channels 8 is designed to be ½ or less than that of the other reaction channels. When the reactor system is assembled under the condition as defined above, there is a possibility that the heat exchange plates 1 and the reaction channels 8 are not blocked perfectly between them, causing a channeling of an un-reacted mixture through a gap between them. In order to prevent this channeling from happening, as shown in FIG. 3, the elongated fixing grooves 21, in which front ends of the heat exchange plates 1 are inserted and fixed, are installed at a location facing the reaction space in the shell 20, i.e., on an inner wall 22 opposite to the insertion side of the heat exchange plates 1 of the reaction channels 8, thereby ensuring the tunneling will not happen.

Any heat exchange plates 1 may be employed as long as they have a shape that is able to expand a heat transfer area like a flat-type plate having a plurality of fins mounted thereon as shown in FIG. 1, as well as a corrugated plate.

FIG. 1 illustrates only a single cell unit of an overall reactor system as mentioned above. A plurality of cell units may be coupled serially and/or in parallel with each other to organize one module of the reactor system in accordance with the embodiment. The organized reactor system may be able to relatively and easily scale up using a concept of a number-up.

In addition, due to improvement in the heat transfer performance, reactivity becomes considerably high relative to the volume of the reactor and thus it is possible to configure a high-performance compact reactor system. Consequently, the reactor system is suitable for small and medium-sized gas fields with a limited gas quantity, and it is able to fully exhibit its own function even in a specialized use such as a FPSO and the like.

On the other hand, in the micro channel reactor system or the multi-channel reactor system, a method that the catalyst material for the reaction is attached to the reactor system is one of the methods to further maximize thermal efficiency, compared to a method to fill the catalyst particulars. In a method of filling the catalyst particles in a reactor portion in the shape of a channel, a heat transfer path is made in the order of a catalyst phase (generation of reaction heat)→a gas phase→the heat transfer surfaces→the heat transfer medium, which suffers from much heat transfer resistance and exhibits a low thermal conductivity in the gas phase, in particular, to degrade heat transfer efficiency.

In contrast, according to the present invention as described above, in the case of attaching a catalyst directly to the heat transfer surfaces to proceed with the reaction, a heat transfer path is achieved in the simplified order of a catalyst phase (generation of reaction heat)→the heat transfer surfaces→the heat transfer medium, which results in omitting the thermal transfer resistance suffered in the gas phase.

Furthermore, the heat exchange unit having the catalyst attached thereto is configured in a removable form. Therefore, when the catalyst's life has ended because of the deactivation of the catalyst, it is possible to separate the heat change unit from the reactor system, remove some or all of the catalysts in a physicochemical method, attach new catalysts to the heat exchange unit and then assemble the heat change unit again, thereby operating the reaction process repeatedly.

The description as mentioned above is merely one embodiment for carrying out the reactor system for producing hydrocarbons from synthesis gas in accordance with the present invention, and the present invention is not limited to the embodiment described above. Therefore, it will be apparent to those of skill in the art that the scope of the embodiment of the present invention is to be determined in reference to the appended claims, along with the full scope to which a variety of modifications are made without departing the scope of the present invention.

The invention claimed is:

1. A reactor system for producing hydrocarbons from synthesis gas, the reactor system comprising:
    a heat exchange unit including a plurality of heat plates and configured to inject a heat transfer medium therein and discharge the heat transfer medium that has been heat exchanged while passing through the heat exchange plates, the heat exchange plates having catalyst material attached thereto;
    a dispersion unit configured to distribute the injected heat transfer medium to the respective heat exchange plates;
    a shell configured to have an inner reaction space into which the heat exchange plates are inserted through an opened side, wherein the inner reaction space is partitioned by the heat exchange plates to define reaction channels, a reaction mixture is injected into the reaction channels and a product mixture is then discharged from the shell;
    a fixing groove arranged on an inner wall of the shell facing the opened side of the shell and configured to fix the inserted heat exchange plates therein; and
    a first flange connected to the heat exchange plates and a second flange connected to the shell, the first flange and the second flange being configured to fasten the heat exchange unit and the shell by being fastened to each other,
    wherein the heat exchange plates are made in the shape of a corrugated plate, and
    wherein each of the heat exchange plates is connected to the first flange so that all of the heat exchange plates are separated from the shell by separating the first flange from the second flange.

2. The reactor system of claim 1, wherein each of the heat exchange plates has a surface with oxidation treatment for easy attachment of the catalyst material thereto.

3. The reactor system of claim 1, wherein an inert material is filled in upper and lower spaces of the reaction channels to distribute the injected reaction mixture and the product mixture.

4. The reactor system of claim 1, wherein two dispersion plates are is installed in upper and lower portions of the reaction channels to distribute the injected reaction mixture and the product mixture.

5. The reactor system of claim 1, wherein an inert material are filled in upper and lower spaces of the reaction channels to distribute the injected reaction mixture and the product mixture; and
    wherein two dispersion plates are installed in upper and lower portions of the reaction channels so that the injected reaction mixture and the product mixture are distributed.

6. The reactor system of claim 1, wherein the catalyst material is attached to the surfaces, which face the heat exchange plates, of the reaction channels at both ends among the reaction channels, and the width of the reaction channels at the both ends is ½ or less than that of the other reaction channels.

7. The reactor system of claim 1, wherein a plurality of the reactor systems is coupled in serial and/or parallel and organized in a module.

8. The reactor system of claim 1, wherein each of the heat exchange plates is connected to the first flange via the dispersion unit.

* * * * *